United States Patent [19]
Oxley et al.

[11] Patent Number: 5,357,935
[45] Date of Patent: Oct. 25, 1994

[54] INTERNAL COMBUSTION ENGINE WITH INDUCTION FUEL SYSTEM HAVING AN ENGINE SHUT DOWN CIRCUIT

[75] Inventors: Lonnie R. Oxley, Versailles; Allan M. Wesche, Georgetown, both of Ky.

[73] Assignee: Clark Material Handling Company, Lexington, Ky.

[21] Appl. No.: 79,574

[22] Filed: Jun. 22, 1993

[51] Int. Cl.[5] .............................................. F02M 21/04
[52] U.S. Cl. ................................. 123/527; 123/198 DB
[58] Field of Search .............. 123/527, 198 D, 198 DB

[56] References Cited
U.S. PATENT DOCUMENTS

| 4,369,751 | 1/1983 | Batchelor et al. | 123/527 |
| 4,483,302 | 11/1984 | Mannessen | 123/527 |
| 4,811,720 | 3/1989 | Katumata et al. | 123/527 |
| 4,841,941 | 6/1989 | Parietti | 123/527 |
| 4,989,573 | 2/1991 | Yokoyoma et al. | 123/198 DB |
| 5,136,986 | 8/1992 | Jensen | 123/27 GE |
| 5,146,903 | 9/1992 | Baverstock | 123/527 |

OTHER PUBLICATIONS

Experimental LP shut-off system installed on X-series Clark lift trucks operated under the control and supervision of Clark Engineering laboratory in Lexington, Ky. on or about Apr. 7, 1992 as an after market retrofit coordinated with the Dealer, Portman Equipment of Cincinnati, Ohio, which supervised the installation through its customer service department in monitoring the performance of the lift truck which had been exposed to over 5,000 hours of operation before the retrofit, the fuel system of the lift truck retrofitted being depicted on page 22 of the Clark Parts Manual, GX230-OQ1-7158 of May 1989 for an LPG truck.

Primary Examiner—E. Rollins Cross
Assistant Examiner—Erick Solis

[57] ABSTRACT

An engine shut-down circuit for a gaseous fuel induction system comprises a solenoid operated three-way valve connected to the electrical system such that when a shut-down condition is sensed, a vacuum signal from the intake manifold is sent to a pressure regulator, causing its internal fuel port to automatically close despite the presence of a residual negative pressure fuel supply signal which would otherwise keep the regulator open, thereby shutting off fuel supply instantaneously, despite continued rotation of the engine, thereby preventing fuel from being inducted into the engine which, if present upon restarting, would likely cause pre-ignition or backfire.

15 Claims, 2 Drawing Sheets

INTERNAL COMBUSTION ENGINE WITH INDUCTION FUEL SYSTEM HAVING AN ENGINE SHUT DOWN CIRCUIT

FIELD OF THE INVENTION

The invention pertains to the art of internal combustion engines having gaseous induction fuel systems, and especially to a propane or methane fuel system having an engine shutdown circuit to override fuel supply signals causing the engine to shut down when any unwanted condition is manifested during normal operations.

BACKGROUND OF THE INVENTION

Smaller to medium sized engines for industrial vehicles, such as counter-balanced, rider, lift trucks, in the 2–6 thousand pound (900–2,700 kg) capacity range run at high rpm's to deliver the required power range and torque output demanded. Many industrial applications that involve lift trucks are in high volume warehouse operations. The trucks are largely confined to aisles or traffic lanes and work in close proximity to warehouse employees. This requires special attention to environmental and human factors. The noise level, as well as the emissions, from the many truck engines is a significant consideration. Despite quieter trucks, the trend is away from gasoline or diesel fuel systems and toward so-called cleaner burning fuels, such as liquid petroleum gas, or propane and methane because of air quality environmental regulations. For example, a fuel system for lift trucks of this type is described in a co-pending application entitled Alternative Fuel System for Powered Industrial Vehicles, Ser. No. 07/860,536, filed Mar. 30, 1992, assigned to the assignee of the present invention.

Unlike a gasoline or diesel fuel system where the fuel reservoir or tank is filled with liquid fuel at atmospheric pressure, and a fuel pump delivers the fuel to a carburetor or to injectors to be atomized and mixed with air in the proper proportions for delivery to the intake manifold of the engine, in a gaseous induction fuel system, fuel at several atmospheres of pressure, e.g. about 180 psi, is delivered to a regulator, the pressure is reduced in the regulator body and gaseous fuel is drawn by the negative manifold pressure to a mixer for combining with air in the proportions required for combustion in the engine. The fuel is contained in a bottle which is removed from the truck when empty, stored in racks outside the building and exchanged for a full bottle recharged with the cubic feet of gas to run the truck for a typical eight-hour work shift.

One of the difficulties with engines that idle at high rpm's and have the type of induction fuel system described is that the inertial effect of the flywheel continues to crank the engine after the ignition is shut off. This causes the manifold vacuum to persist momentarily which is sensed by the induction system as an engine running condition, although the ignition key has been turned off. The overrun is of short duration, yet it results in fuel mixture being drawn into the combustion chambers of the engine and if the engine is restarted before this fuel has dissipated, a pre-ignition may result, possibly aggravated by a slight timing misadjustment, and the engine backfires. Even if the truck meets or exceeds OSHA noise levels in normal operation, this condition is sure to be objectionable in a work place where many trucks are working.

While one option may be to leave the engine running during brief interruptions of operation, today's air quality standards require so-called clean air in fully ventilated buildings, and these air standards could not be met if trucks were left running when not in use

SUMMARY OF THE INVENTION

In accordance with the invention, an induction fuel system has a shutdown circuit delivering a vacuum signal corresponding to system intake manifold pressure that immediately causes interruption of fuel supply and shuts down the engine despite continued fuel supply commands being received by the fuel system.

The engine shut down circuit comprises a solenoid operated valve connected to the electrical system such that when a shut down condition is sensed, a vacuum signal proportional to the intake manifold pressure counteracts a fuel supply signal causing an internal fuel supply port to automatically close despite the presence of a residual negative pressure fuel supply signal which would otherwise keep the fuel port open. Upon restarting the engine, the solenoid operated valve shuts off the vacuum signal, allowing the fuel supply command signal to function as normal.

Accordingly, one of the objects of the invention is to provide an induction fuel system having a vacuum-sensing circuit which, during normal engine operation, allows the system to operate in a conventional fashion, but when a shut down condition is sensed, delivers a vacuum signal which cancels the fuel supply signal and causes the system to discontinue the fuel supply.

Another object of the invention is to provide a fuel system having an over-ride circuit that functions to shut off the fuel supply when the ignition key is turned off to prevent objectionable backfire.

Another object of the invention with reference to preventing pre-ignition in an industrial vehicle operating with an existing induction fuel system is to provide a shut-down circuit that can be installed on the existing fuel system in a relatively short time with inexpensive components sold for after-market installation by the user.

Another object is to provide an engine shut-down circuit that can be adapted to function in many different ways, and on different types of engines in a variety of applications where it may be desirable to shut down the engine despite the fuel system continuing to receive commands to deliver fuel to the combustion chambers of the engine. A low oil pressure condition could be sensed by a detector generating an electrical signal to activate the system if the operator were unaware of the low oil pressure due to a broken oil pressure meter. Therefore, it will be appreciated that the fuel shut-down system, according to the present invention, could monitor a variety of engine conditions for purposes of automatic shut-down which would remain within the objects of the present invention.

These and other objects will be more appreciated by reference to the following detailed description of the invention, and the drawings of a preferred embodiment of the invention:

DETAILED DESCRIPTION OF A PREFERRED EMBODIMENT OF THE INVENTION

While a preferred embodiment of the invention will be illustrated with respect to a conventional gaseous fuel induction system used in a 2,000–6,000 pound lift truck having a small to mid-sized, four-cycle, four cylinder internal combustion engine adapted to burn propane or methane fuel and where work place conditions make a backfire particularly objectionable, the invention is not limited to material handling vehicles or to the prevention of this one condition, but has utility in a variety of engines and conditions that could cause damage to the engine.

Figure 1:
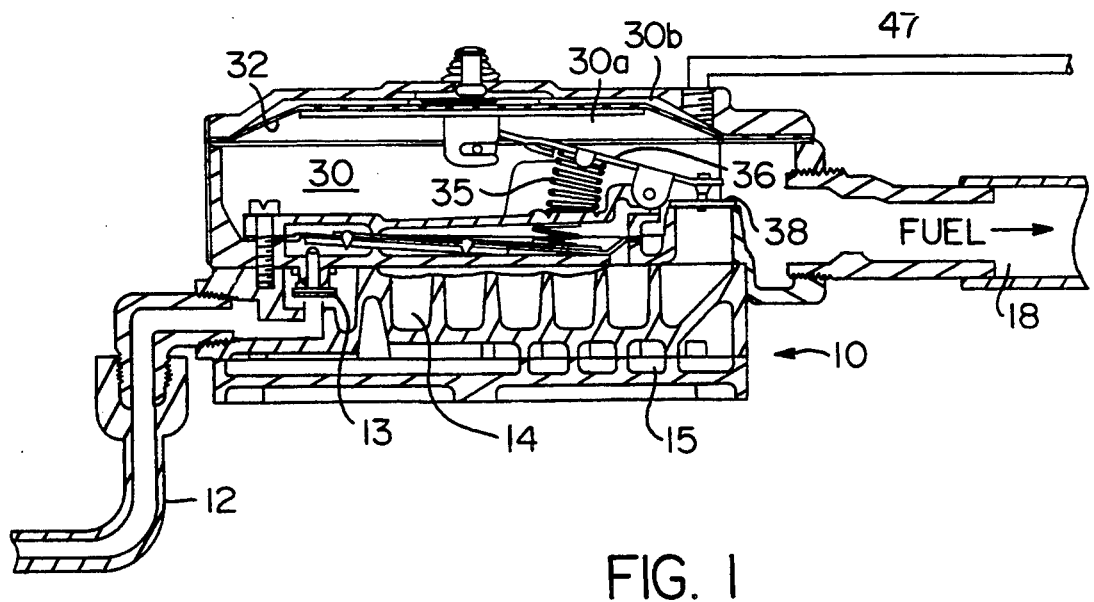
Fig. 1 is a cross-sectional view of a fuel regulator for a gaseous fuel induction system showing, in partial view, a preferred embodiment of a fuel shut-down system connected in parallel with the fuel system.
Figure 2:
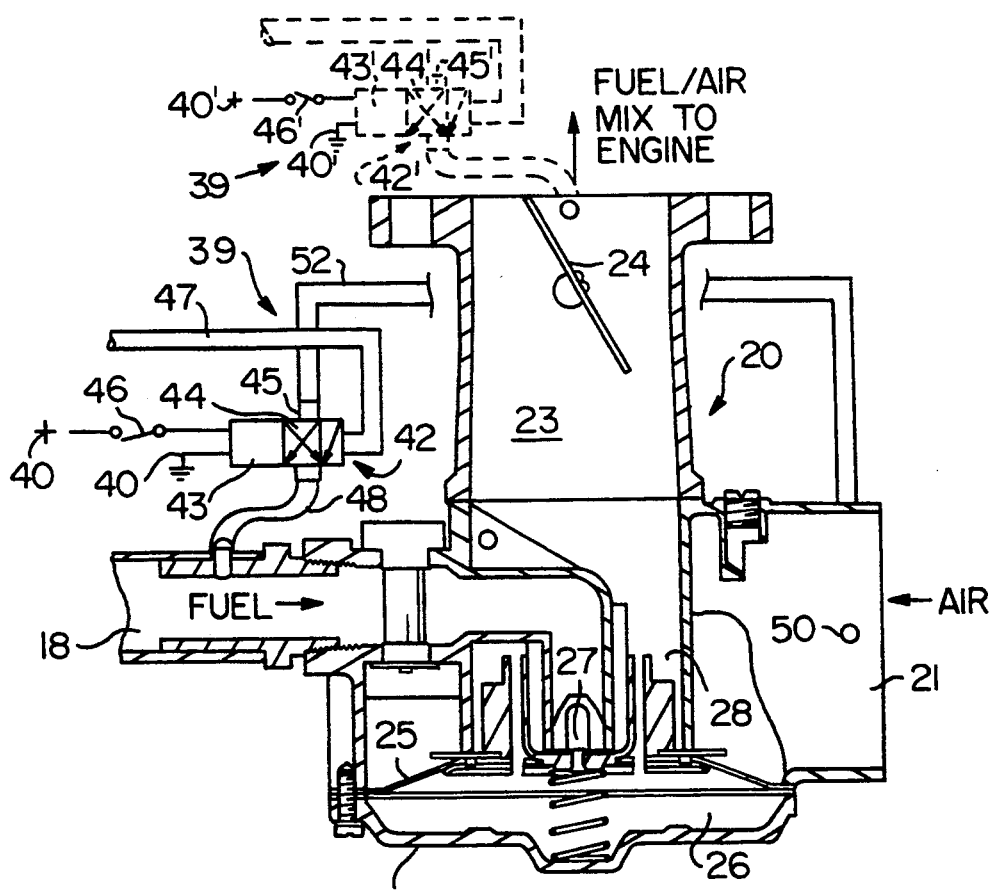
FIG. 2 is a cross-sectional view of a mixer connected down stream of the regulator in FIG. 1 showing one arrangement of the parallel shut-down system.

Referring to FIG. 1, a conventional regulator body, 10, receives liquified or gaseous fuel from a high pressure line, 12. A bottle (not shown) carried on the truck, to which the opposite end of line 12 connects, supplies fuel to the regulator and will have the cubic feet of gas necessary for a full shift. It will be at a pressure of up to 180 psi, at ambient temperatures. The fuel enters an expansion chamber, 14, through a port 13. The chamber 14 is in heat transfer relationship with a series of heat exchanger passages, 15, connected to the engine coolant system. Liquid coolant at engine operating temperature is circulated through passages 15 to provide sufficient heat to the regulator body, 10, to prevent freeze-up due to the refrigeration effect occurring as a result of the expansion of the fuel in chamber 14. A low pressure fuel line, 18, is connected to a mixer body, 20, (FIG. 2). Air drawn in through air intake opening 21 is mixed in a mixer section 28 with the raw fuel in the right proportions for combustion in the engine. The mixer body has a throat, 23, in which a throttle, 24, is adjusted between opened and closed positions in a known manner for supplying the volume of fuel/air mixture required by the engine. The throat, 23, is connected to the engine intake manifold (not shown). A spring biased diaphragm 25 is exposed to negative pressure in chamber 26, formed by cover plate 22, from the manifold and to filtered air from air intake 21 on the opposite side so as to create a pressure differential that controls a fuel-metering valve assembly 27 regulating the flow of fuel and air into a mixer chamber 28 as the engine operating conditions demand. The demand for fuel varies with the load. The rate the fuel is supplied varies directly with the manifold vacuum which is proportional to the engine requirements, hence diaphragm 25 acts to produce a variable fuel supply command signal delivered to the regulator body 10 according to the pressure differential which controls the metering action of valve assembly 27.

A diaphragm, 32, in the regulator body, 10, divides chamber, 30, into a lower portion, 30a, and an upper portion 30b. The upper portion, 30b, of chamber 30 is vented, as will be described. The fuel supply command signal is communicated from the mixer 20 through fuel line 18 to the the lower portion 30a. The diaphragm, 32, is yieldably flexed against the bias of coil spring, 35, causing a lever, 36, to pivot opening inlet port 13 and a fuel port, 38, allowing low pressure fuel from the expansion chamber, 14, to enter the fuel line 18. So long as the engine is running and a fuel supply command signal is being delivered by the line 18, the diaphragm, 32, will hold the inlet port 13, and outlet port 38, open to provide the supply of fuel called for by the engine. A regulator and mixer of the type described are commercially available from Imperial Machine Products Company of Cerritos, Calif.

In leaving the truck, the operator places the torque converter selector lever in a neutral position and sets the hand brake. This removes any load on the engine when shutting it off, allowing it to overrun due to the inertial effect of the flywheel. Because of the high rpms of industrial engines, it is fairly common for the engine to overrun after the ignition has been turned off. The result is that a fuel supply command signal continues to be delivered to the chamber, 30a, momentarily. If the interruption is frequent, and of short duration, the engine is repeatedly restarted before all of the fuel mixture in the combustion chambers has dissipated. The resumption of operations after such a shut down will be accompanied by frequent occurrences of the pre-ignition syndrome, described earlier, which is particularly prevalent in operating lift trucks where the operator is required to get off the truck and perform some repeated task, usually of short duration, before returning to the truck. When the operator wishes to restart the engine and there has not been sufficient time for the fuel mixture trapped in the cylinders to dissipate, it is likely to be pre-ignited causing a backfire when restarting the engine. The fuel mixture can also get into the exhaust system and backfire a few seconds after shutting off the engine. This pre-ignition, or post-shut-down backfire syndrome is especially annoying where high volume material handling operations require many lift trucks to make frequent stops.

Figure 2A:
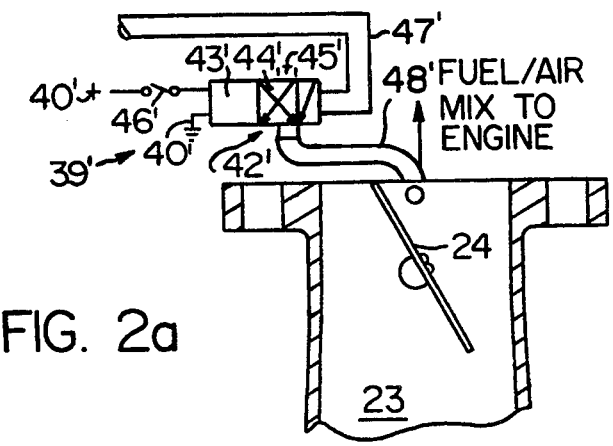
FIG. 2a is a variation of the fuel shut-down system in FIGS. 1 and 2 showing a different arrangement for connecting the system.

In accordance with a preferred embodiment of the invention, an electro-mechanical shut down system, 39, powered by the electrical system of the truck, as represented by the battery terminals, 40, is connected in parallel with the induction fuel system described so as to automatically operate when the ignition is turned off, shutting down the regulator 10 of the fuel system. A solenoid operated three-way valve, 42, has a solenoid section, 43, and a valve body section, 44. A valve element in the body section 44 has one position when the solenoid is energized that vents chamber 30b through a line 47 connected to the port 45 when the ignition circuit, as illustrated by the key switch poles, 46, is closed and the engine is running. The vent port 45 is connected to filtered air delivered by a line 52 connected to the air intake 21 of the mixer 20 at opening 50. Alternatively, line 52 can be omitted and port 45 vented to filtered air opening directly to atmosphere. This variation is depicted FIG. 2a where prime numbers designate corresponding structure performing the same or similar function. This variation will partially compensate for a clogged air filter, and may be preferable in high restriction air intake systems. It also eliminates line 52 making it simpler to install and service. When an engine shut down condition is sensed, such as by turning off the ignition key 46, solenoid 43 is de-energized thereby actuating the valve element in the value body section 44 to close off the vent port 45, and simultaneously open line 47 to a line 48 connected to the fuel line 18. Alternatively, as shown in the system 39' depicted in FIG. 2a, the line 47' connects with a line 48' directly to manifold vacuum in the mixer throat 23' between the throttle 24' and the intake manifold. This variation would supply a more positive, or direct acting vacuum signal to counteract the fuel supply signal in chamber 30a and provide a broader range of operating characteristics. It will be understood that with either version, the vacuum signal delivered by line 47, 47' to the chamber 30b counteracts the fuel supply command signal on the opposite side of the diaphragm 32 in the regulator body 10 so that the coil spring 45 forces diaphragm 32 in one direction, toward the side of the chamber 30 as depicted in FIG. 1. This closes off the fuel port 38 and the inlet port 13. The fuel shut down systems 39, 39' will preferably have a flow rate in the range of 0.60 to 0.65 and optimally of about 0.63 scfm at 10" of mercury for the vacuum in a four-cycle lift truck engine.

Figure 3:
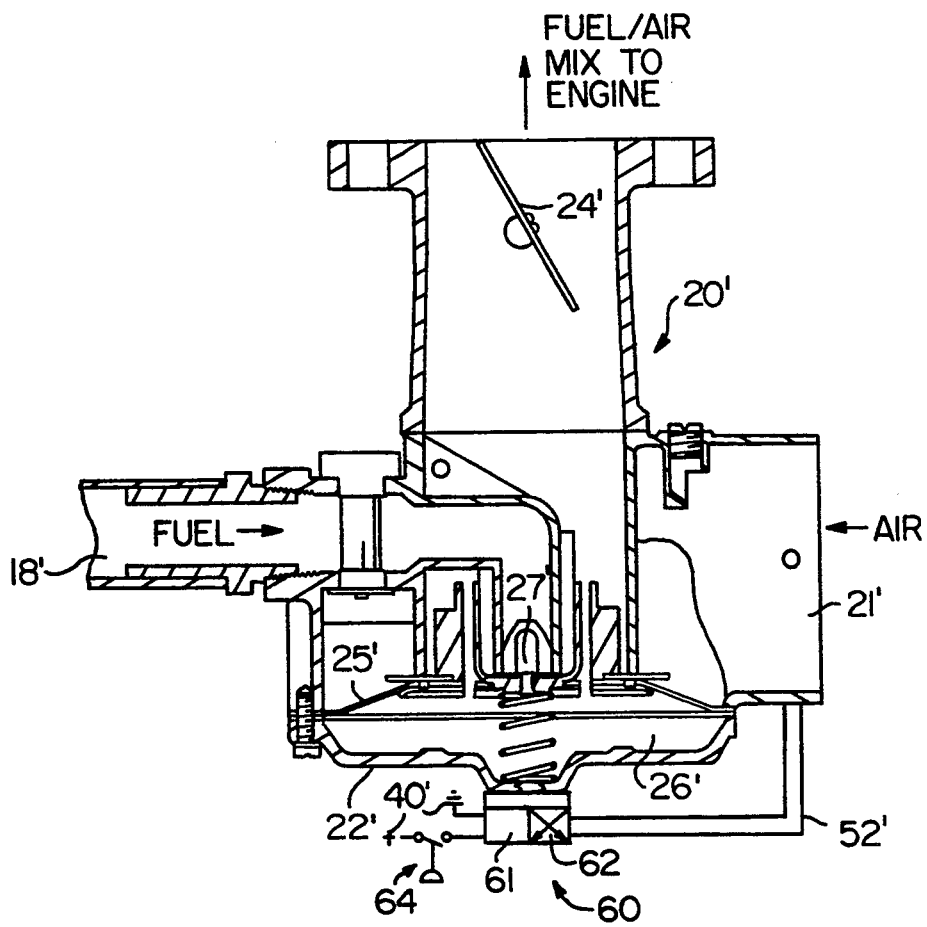
FIG. 3 is a cross-sectional view of another embodiment showing a version of the shut-down system connected in series.
Figure 3A:
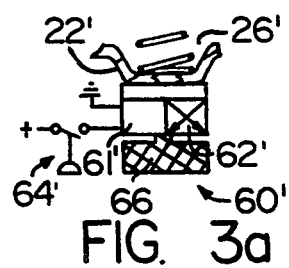
FIG. 3a is a variation of the system in FIG. 3 showing a different arrangement of the series connected system.

FIGS. 3 and 3a show other variations of the fuel shut down system. The systems 39, 39' in FIGS. 1, 2 and 2a can be described as parallel systems. Whereas the versions in FIGS. 3 and 3a are series installations because they are in series with the mixer 20, and do not involve the regulator 10. These versions eliminate a number of lines and parts employed in the parallel versions, described as such because they provide a vacuum signal in parallel with the fuel supply command signal. In the embodiment depicted in FIG. 3, parts which are similar to those described in systems 39, 39' have the same numerals with a prime designation. In FIG. 3, solenoid operated two-way valve 60 has a solenoid section 61 and a two-way valve body section 62. One part opens directly into the chamber 26' through the cover plate 22' of the mixer body 20'. A pressure switch 64 monitors engine oil pressure. If the pressure drops below a predetermined amount, switch 64 is closed to energize the solenoid 61 so as to actuate the valve element in the two-way valve body 62 causing it to vent the chamber 26' through a line 52' to the air intake 21'. As a result, the fuel supply command signal otherwise delivered by the mixer is "cancelled," shutting off the fuel supply from line 18' at the valve assembly 27'. Thus, fuel is present in the lines nearer to the intake manifold which will result in a quicker restart because the fuel lines are primed up to the valve assembly 27'. Also, this variation of the shut-down system does not require as many lines interconnecting the various components, has simpler, less costly parts than the parallel version, would take less labor to install in aftermarket applications, and could be more readily sold to end users in kit form. An alternative version in FIG. 3a further simplifies the structure of FIG. 3 by eliminating line 52'. A removable filter element 66 is mounted directly over the air intake of the two-way valve body 62' admitting filtered air to the chamber 26' when solenoid 61' is actuated, instead of from the air intake 21' of the mixer. This variation will compensate for a clogged air filter, or a restricted air intake system, in the same fashion as venting port 45' to a separate source of filtered air as shown in the parallel system in FIG. 2a.

As with operation of the parallel shut-down systems, when engine shut down is required, in this case due to low oil pressure, solenoid 61, 61' is energized to connect chamber 26' to filtered air, either through line 52' or through the filter element 66 attached directly to the valve body such that the diaphragm 25' is biased to the valve closing position, shutting off raw fuel at the valve assembly 27'.

The foregoing description of a preferred embodiment of the invention as illustrated in FIGS. 1 and 2 is for purposes of illustration and not intended to cover every conceivable variation or to limit the invention to the precise fuel shutdown circuit disclosed in the drawings. Rather, modifications or variations are possible in light of the disclosure herein as suggested by the variations in FIGS. 2a, 3 and 3a. A preferred embodiment is used to illustrate the best mode of carrying out the invention utilizing the principles disclosed. However, the particular circumstances of use described may suggest other modifications or variations to persons skilled in the art who will appreciate the full scope of the invention as determined by the appended claims and as interpreted by a reasonable range of equivalence. Other elements may be substituted for corresponding structure disclosed in the preferred embodiment that function in substantially the same way for substantially the same purpose. For example, reference was made earlier in the disclosure to a detector for low oil pressure. This detector could generate an "off" electrical signal corresponding to the "off" signal of the key switch to energize or de-energize a solenoid controlling a valve. Therefore, it is anticipated that modifications or variations will be made that fall within the scope of the appended claims.

What is claimed as the invention is set forth as follows:

1. In an internal combustion engine having a combustion chamber, an induction fuel system for gaseous fuel including a vessel containing a source of pressurized fuel, regulator means connected to the vessel acting to reduce the fuel pressure, mixer means connected to the regulator means for receiving the pressure reduced fuel and mixing it with air to form a fuel/air mixture in accordance with a fuel supply command signal as required by the demands of the engine, and throttle means controlling the quantity of fuel/air mixture inducted into the combustion chamber to satisfy the fuel requirements of the engine, the improvement comprising an engine shut-down system producing a vacuum signal proportional to the negative pressure existing in the intake manifold, sensing means responsive to an engine condition being monitored, valve means causing the vacuum signal to be delivered to the fuel system to counter the fuel supply command signal causing the fuel system to shut off fuel supply despite the continued presence of a fuel supply command signal.

2. The improvement as set forth in claim 1, wherein said sensing means comprises an electrical circuit responsive to an external electrical signal, said valve means comprising a solenoid actuated valve actuated by said electrical signal, a fluid line connecting the regulator means to the valve normally venting the regulator means to a source of filtered air through said valve when a fuel supply command signal is being received by the regulator means, a vacuum signal line communicating with negative pressure derived from the intake manifold, said valve being actuated to connect the vacuum signal to said fluid line responsive to said external electrical signal to deliver the vacuum signal in parallel to counter the fuel supply command signal.

3. The improvement as set forth in claim 2, wherein the electrical signal is associated with the ignition circuit of the engine, said electrical signal being generated when the ignition is turned off.

4. The improvement as set forth in claim 2 wherein said source of filtered air is the mixer means upstream of the regulator means, and a second fluid line connects the valve to the mixer means.

5. The improvement as set forth in claim 2 wherein the vacuum signal line communicates with the mixer means between the throttle and the intake manifold.

6. The improvement as set forth in claim 2 wherein the vacuum signal line communicates with the fuel supply between the regulator means and mixer means.

7. An internal combustion engine having an induction fuel system comprising an intake manifold for delivering a fuel/air mixture to a combustion chamber of the engine, a vessel supplying gaseous fuel under pressure, regulator means for receiving the high pressure fuel and reducing the pressure to a level suitable for combustion in the engine, mixer means for mixing the low pressure fuel with air connected to the regulator means and delivering the mixture to the manifold, said regulator means having an internal regulator chamber, a flexible diaphragm dividing said chamber into an ambient pressure side and a vacuum pressure side, fuel supply means in the regulator means responsive to the flexing of said diaphragm to vary the fuel supply, and valve means operable selectively to communicate negative pressure to the ambient pressure side of said diaphragm counteracting fuel supply commands and thereby shutting off the fuel despite the continued presence of fuel supply commands.

8. An internal combustion engine as set forth in claim 7 wherein said valve means comprises an electrically operated solenoid actuating said valve means to stop supply of ambient air to the ambient air side the diaphragm simultaneously with it being connected to negative manifold pressure, counteracting the negative pressure and an electrical signal generated by the ignition system of the engine responsive to an external condition adverse to continue the operation of the engine for operating said solenoid.

9. An internal combustion engine according to claim 8, wherein said external condition is the turning off of the ignition switch.

10. In a powered industrial truck having a four-cycle internal combustion engine operated at high rpm for delivering the required power range and torque output demanded by the loading conditions of a material handling operation, a pressure vessel supplying gaseous fuel under pressure, a regulator means for receiving the gaseous fuel and reducing the pressure to a level suitable for combustion in the engine, a mixer for receiving the gaseous fuel in the lowered pressure state and mixing it with air in proportions required for combustion in the engine, throttle means for regulating the volume of fuel mixture being supplied to the engine, an intake manifold connected to the mixer for receiving the fuel mixture and distributing it to the combustion chambers of the engine, engine manifold pressure being used by said mixer and regulator means for metering the quantity of fuel admitted, the improvement comprising an engine shut-down system comprising means to generate a shut-down signal responsive to an external condition, causing said engine manifold pressure to be counteracted whereby fuel is shut off despite the continued existence of fuel supply commands received by said regulator and mixer means.

11. The improvement as set forth in claim 10 wherein the external condition is the turning off of the ignition after putting the truck in neutral.

12. The improvement as set forth in claim 10 wherein the engine shut-down system comprises a solenoid operated valve connected to the mixer in series so as to shut off fuel closer to the intake manifold.

13. The improvement as set forth in claim 10 wherein the minimum flow rate of the shut-down system is in excess of about 0.60 scfm at 10 inches of mercury manifold vacuum.

14. The improvement as set forth in claim 12 wherein the solenoid operated valve is actuated by a low oil pressure signal.

15. The improvement as set forth in claim 12 wherein the solenoid operated valve is connected to ambient air, and a removable filter element is connected to the valve for filtering the air intake.

* * * * *